US011950305B2

(12) United States Patent
Wang

(10) Patent No.: US 11,950,305 B2
(45) Date of Patent: *Apr. 2, 2024

(54) INFORMATION CONFIGURATION METHOD AND TERMINAL

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 130 days.

This patent is subject to a terminal disclaimer.

(21) Appl. No.: 17/522,516

(22) Filed: Nov. 9, 2021

(65) Prior Publication Data
US 2022/0070957 A1 Mar. 3, 2022

Related U.S. Application Data

(63) Continuation of application No. 17/167,928, filed on Feb. 4, 2021, now Pat. No. 11,229,079, which is a
(Continued)

(51) Int. Cl.
*H04W 76/15* (2018.01)
*H04W 24/10* (2009.01)
(Continued)

(52) U.S. Cl.
CPC .......... *H04W 76/15* (2018.02); *H04W 24/10* (2013.01); *H04W 76/11* (2018.02); *H04W 76/19* (2018.02); *H04W 76/27* (2018.02)

(58) Field of Classification Search
CPC ..... H04W 76/11; H04W 76/19; H04W 76/15; H04W 76/27; H04W 24/10
See application file for complete search history.

(56) References Cited

U.S. PATENT DOCUMENTS 9,055,565 B2   6/2015   Kim
9,337,967 B2   5/2016   Kim et al.
(Continued)

FOREIGN PATENT DOCUMENTS

CN   103582126 A   2/2014
CN   104412532 A   3/2015
(Continued)

OTHER PUBLICATIONS

Ericsson, "Measurement configurations and signaling for fast setup", 3GPP TSG-RAN WG2 #99 R2-1708026 (Revision of R2-1707237), Berlin, Germany, Aug. 21-25, 2017, entire document.
(Continued)

*Primary Examiner* — Chi Ho A Lee
*Assistant Examiner* — Andrew Lee
(74) *Attorney, Agent, or Firm* — Ladas & Parry, LLP

(57) ABSTRACT

Embodiments of the present application provide an information configuration method and a terminal. The method includes: a terminal receives first configuration information sent by a target base station, the first configuration information comprising at least one secondary node configuration; if the first configuration information comprises one secondary node configuration, after the terminal receives the first configuration information, the secondary node configuration is in an active state; if the first configuration information comprises multiple secondary node configurations, the terminal selects, on the basis of the cell signal measurement signal in an inactive state, one secondary node configuration from the multiple secondary node configurations, and informs the target base station of the selected secondary node configuration so that the secondary node configuration is in an active state.

19 Claims, 3 Drawing Sheets

A terminal receives first configuration information sent by a target base station, the first configuration information includes at least one SN configuration — 301

The terminal determines a target SN configuration in the at least one SN configuration and triggers the target SN configuration to be in an active state — 302

Related U.S. Application Data continuation of application No. PCT/CN2018/099330, filed on Aug. 8, 2018.

(51) Int. Cl.
*H04W 76/11* (2018.01)
*H04W 76/19* (2018.01)
*H04W 76/27* (2018.01)

(56) References Cited

U.S. PATENT DOCUMENTS

| | | | |
|---|---|---|---|
| 9,775,188 | B2 | 9/2017 | Kim |
| 9,888,474 | B2 | 2/2018 | Kim et al. |
| 2013/0165124 | A1 | 6/2013 | Liang et al. |
| 2013/0208689 | A1 | 8/2013 | Kim |
| 2014/0122616 | A1 | 5/2014 | Shang |
| 2015/0099501 | A1 | 4/2015 | Kim et al. |
| 2015/0256301 | A1 | 9/2015 | Kim et al. |
| 2016/0157110 | A1 | 6/2016 | Chang |
| 2016/0255634 | A1 | 9/2016 | Kim et al. |
| 2016/0338039 | A1 | 11/2016 | Van Der Velde et al. |
| 2017/0311211 | A1* | 10/2017 | Chiba ............... H04W 36/0069 |
| 2017/0353989 | A1 | 12/2017 | Kim |
| 2018/0035323 | A1 | 2/2018 | Li et al. |
| 2018/0092156 | A1 | 3/2018 | Kim et al. |
| 2018/0359790 | A1 | 12/2018 | Ingale et al. |
| 2018/0376514 | A1 | 12/2018 | Wang |
| 2019/0053292 | A1 | 2/2019 | Ali et al. |
| 2019/0090144 | A1 | 3/2019 | Wu |
| 2019/0150161 | A1* | 5/2019 | Cheng .................. H04W 80/02 370/330 |
| 2019/0281650 | A1 | 9/2019 | Wu |
| 2019/0357292 | A1* | 11/2019 | Cirik ..................... H04W 72/23 |
| 2019/0364602 | A1* | 11/2019 | Yi ......................... H04W 72/20 |
| 2020/0008100 | A1 | 1/2020 | Peng et al. |
| 2020/0037345 | A1 | 1/2020 | Ryoo et al. |
| 2020/0120535 | A1 | 4/2020 | Dai et al. |
| 2020/0120584 | A1* | 4/2020 | Yi ..................... H04W 74/0866 |
| 2020/0169906 | A1 | 5/2020 | Tsuboi et al. |
| 2020/0196232 | A1 | 6/2020 | Drevö et al. |
| 2020/0214073 | A1 | 7/2020 | Shimoda et al. |
| 2020/0236596 | A1 | 7/2020 | Liu et al. |
| 2020/0288338 | A1* | 9/2020 | Freda .................... H04W 76/27 |
| 2021/0084543 | A1 | 3/2021 | Wang et al. |
| 2021/0153281 | A1* | 5/2021 | Deogun ............... H04W 80/02 |
| 2021/0168893 | A1 | 6/2021 | Al et al. |
| 2021/0195451 | A1* | 6/2021 | Da Silva .......... H04W 36/0085 |
| 2021/0274587 | A1* | 9/2021 | Jung ................. H04W 12/0433 |

FOREIGN PATENT DOCUMENTS

| | | |
|---|---|---|
| CN | 106031292 A | 10/2016 |
| EP | 3691400 A1 | 8/2020 |
| EP | 3742815 A1 | 11/2020 |
| EP | 3790355 A1 | 3/2021 |
| JP | 2016527828 A | 9/2016 |
| KR | 20160041970 A | 4/2016 |
| KR | 20160116330 A | 10/2016 |
| KR | 20180079293 A | 7/2018 |
| RU | 2621072 C2 | 5/2017 |
| RU | 2628327 C2 | 8/2017 |
| WO | 2015017997 A1 | 2/2015 |
| WO | 2015109490 A1 | 7/2015 |
| WO | 2016161625 A1 | 10/2016 |
| WO | 2018117928 A1 | 6/2018 |

OTHER PUBLICATIONS

First Office Action of the Japanese application No. 2021-506445, dated Jul. 15, 2022 with machine translation provided by Global Dossier.
First Office Action of the Chinese application No. 202110258377.7, dated Jul. 21, 2022 with machine translation provided by Global Dossier.
First Office Action of the Korean application No. 10-2021-7006832, dated Aug. 9, 2022 with machine translation provided by Global Dossier.
Second Office Action of the European application No. 18929650.2, dated Sep. 5, 2022.
International Search Report in the international application No. PCT/CN2018/099330, dated Apr. 30, 2019; patent document filed in parent U.S. Appl. No. 17/167,928.
3GPP TS 38.331 V16.1.0 (Jul. 2020), 3rd Generation Partnership Project; Technical Specification Group Radio Access Network; NR; Radio Resource Control (RRC) protocol specification (Release 16), entire document (filed in parent U.S. Appl. No. 17/167,928 ).
Written Opinion of the International Search Authority in the international application No. PCT/CN2018/099330, dated Apr. 30, 2019 (filed in parent U.S. Appl. No. 17/167,928 ).
Supplementary European Search Report in the European application No. 189269650.2 dated Jun. 18, 2021 (filed in parent U.S. Appl. No. 17/167,928).
First Office Action of the Russian application No. 2021102370, dated Oct. 19, 2021.
First Office Action of the U.S. Appl. No. 17/167,928, dated Mar. 22, 2021.
Final Office Action of the U.S. Appl. No. 17/167,928, dated Jul. 2, 2021.
Ericsson: "RRC suspend/resume in MR-DC", 3GPP Draft; R2-1708024, Aug. 20, 2017, XP051317936, Retrieved from the Internet: URL: http://www.3gpp.org/ftp/Meetings_3GPP_SYNC/RAN2/Docs/, entire document.
First Office Action of the European application No. 18929650.2, dated Mar. 14, 2022.
First Office Action of the Canadian application No. 3108686, dated Feb. 24, 2022.
Written Opinion of the Singaporean application No. 11202101188P, dated Oct. 14, 2022.
Second Office Action of the Canadian application No. 3108686, dated Dec. 5, 2022.
Second Office Action of the Chinese application No. 202110258377.7, dated Oct. 24, 2022 with machine translation by Global Dossier.
Notice of Intention to Refuse of the Singaporean application No. 11202101188P, dated Apr. 28, 2023.
First Office Action of the corresponding Mexican application No. MX/a/2021/001451, dated Nov. 30, 2023. 7 pages with English translation.

\* cited by examiner

US 11,950,305 B2

INFORMATION CONFIGURATION METHOD AND TERMINAL

CROSS-REFERENCE TO RELATED APPLICATIONS

The present application is a continuation of U.S. application Ser. No. 17/167,928 filed on Feb. 4, 2021, which is a continuation of International Application No. PCT/CN2018/099330 filed on Aug. 08, 2018, the disclosures of which are hereby incorporated by reference in their entireties.

TECHNICAL FIELD

Embodiments of the application relate to the technical field of mobile communication, and particularly to an information configuration method and a terminal.

BACKGROUND

For meeting the pursuits of people for rates, delays, high-speed mobility and power efficiency of services as well as diversity and complexity of services in the future, the 3rd Generation Partnership Project (3GPP) starts researching and developing 5th Generation (5G).

A radio part of 5G is called New Radio (NR). During early deployment of NR, it is unlikely to implement complete NR coverage, so typical network coverage is a combination of Long Term Evolution (LTE) coverage and NR coverage. In addition, for protecting early investments of a mobile operating company in LTE, a working mode of tight interworking between LTE and NR is proposed. Of course, an NR cell may also be deployed independently.

Through a Dual Connectivity (DC) architecture, a terminal may access a network through two links. A DC network includes a Master Node (MN) and a Secondary Node (SN). Under a normal condition, the MN may determine whether to add an SN or update the SN or not based on a measurement reporting result of User Equipment (UE). After the UE in a DC mode enters an inactive state, when a Radio Resource Control (RRC) connection is resumed, no appropriate SN information may be configured for the UE in a Message 4 (MSG4).

SUMMARY

The embodiments of the application provide an information configuration method and a terminal.

The embodiments of the application provide an information configuration method, which includes the following operations.

A terminal receives first configuration information sent by a target base station, the first configuration information includes at least one SN configuration.

The terminal determines a target SN configuration in the at least one SN configuration and triggers the target SN configuration to be in an active state.

The embodiments of the application provide an information configuration method, which includes the following operation.

A target base station sends first configuration information to a terminal, the first configuration information includes at least one SN configuration and the at least one SN configuration is used for the terminal to determine a target SN configuration to trigger the target SN configuration to be in an active state.

The embodiments of the application provide a terminal, which includes a processor and a memory. The memory is configured to store computer programs, and the processor is configured to call and run the computer programs stored in the memory to execute the information configuration method.

BRIEF DESCRIPTION OF THE DRAWINGS

The drawings described herein are adopted to provide a further understanding to the application and form a part of the application. Schematic embodiments of the application and descriptions thereof are adopted to explain the application and not intended to form improper limits to the application. In the drawings.

DETAILED DESCRIPTION

The technical solutions in the embodiments of the application will be described below in combination with the drawings in the embodiments of the application. It is apparent that the described embodiments are not all embodiments but part of embodiments of the application. All other embodiments obtained by those of ordinary skill in the art based on the embodiments in the application without creative work shall fall within the scope of protection of the application.

The technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a UMTS, a Worldwide Interoperability for Microwave Access (WiMAX) communication system or a future 5G system.

Figure 1:
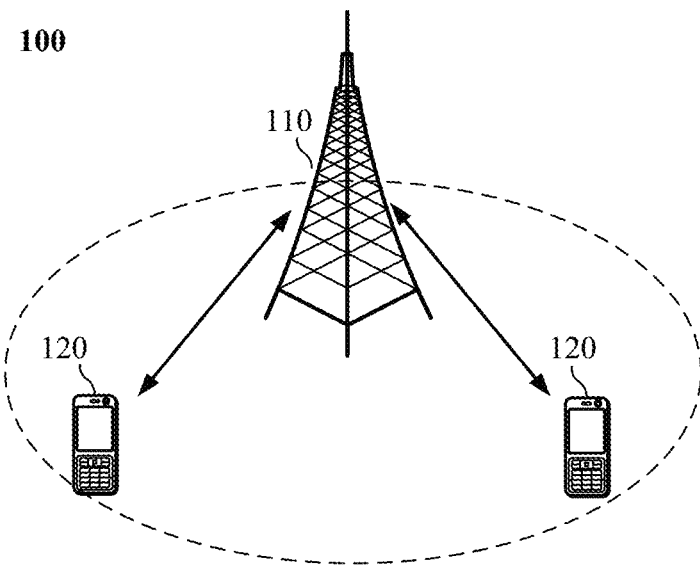
FIG. 1 is a schematic architecture diagram of a communication system according to an embodiment of the application.

Exemplarily, a communication system 100 that the embodiments of the application are applied to is shown in FIG. 1. The communication system 100 may include a network device 110, and the network device 110 may be a device communicating with a terminal 120 (or called a communication terminal and a terminal). The network device 110 may provide communication coverage for a specific geographical region and may communicate with a terminal located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal 120 within the coverage of the network device 110. The "terminal" used herein includes, but not limited to, a device configured to receive/send a communication signal through a wired line connection, for example, through Public Switched Telephone Network (PSTN), Digital Subscriber Line (DSL), digital cable and direct cable connections, and/or another data connection/network and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal, and/or an Internet of Things (IoT) device. The terminal configured to communicate through a wireless interface may be called a "wireless communication terminal", a "wireless terminal" or a "mobile terminal." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal in the 5G network, a terminal in the future evolved PLMN or the like.

Optionally, Device to Device (D2D) communication may be performed between the terminals 120.

Optionally, the 5G system or the 5G network may also be called an NR system or an NR network.

A network device and two terminals are exemplarily shown in FIG. 1.

Optionally, the communication system 100 may include multiple network devices and another number of terminals may be included in coverage of each network device. There are no limits made thereto in the embodiments of the application.

Optionally, the communication system 100 may further include another network entity such as a network controller and a mobility management entity. No limits are made thereto in the embodiments of the application.

It is to be understood that a device with a communication function in the network/system in the embodiments of the application may be called a communication device. For example, for the communication system 100 shown in FIG. 1, communication devices may include the network device 110 and terminal 120 with the communication function, and the network device 110 and the terminal 120 may be the specific devices mentioned above and will not be elaborated herein. The communication devices may further include other devices in the communication system 100, for example, other network entities like a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The technical solutions of the embodiments of the disclosure are mainly applied to a 5G system. Of course, the technical solutions of the embodiments of the disclosure are not limited to the 5G system and may also be applied to mobile communication systems of other types. Main application scenarios of the 5G system will be described below.

1) An Enhanced Mobile Broadband (eMBB) scenario: eMBB aims to enable a user to obtain a multimedia content, service and data, and service requirements thereof increase rapidly. Since eMBB may be deployed in different scenarios, for example, a room, an urban area and a rural area, and service capabilities and requirements thereof are also greatly different, it is necessary to analyze a service in combination with a specific deployment scenario.

2) An Ultra-Reliable and Low Latency Communication (URLLC) scenario: typical applications of URLLC include industrial automation, power automation, remote medical operation, traffic safety guarantee and the like.

3) An massive Machine Type Communication (mMTC) scenario: typical characteristics of mMTC include high connection density, small data volume, delay-insensitive services, low cost and long service life of modules and the like.

On the other hand, a DC architecture includes EN-DC, NR-E-UTRAN DC (NE-DC), 5G Core (5GC)-EN-DC and NR DC. In EN-DC, an LTE node is an MN, an NR node is an SN, and an Evolved Packet Core (EPC) is connected. In NE-DC, an NR node is an MN, an Enhanced LTE (eLTE) node is an SN, and a 5GC is connected. In 5GC-EN-DC, an eLTE node is an MN, an NR node is an SN, and the 5GC is connected. In NR DC, an NR node is an MN, an NR node is an SN, and the 5GC is connected.

Figure 2:
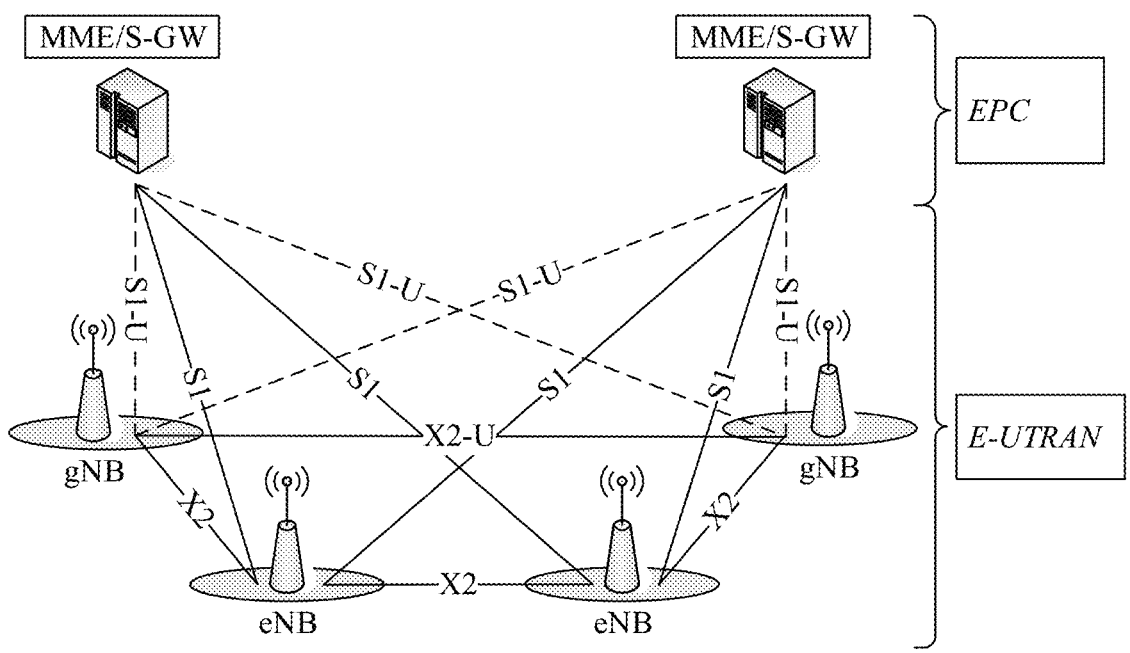
FIG. 2 is an overall networking architecture diagram of Evolved Universal Mobile Telecommunication System (UMTS) Terrestrial Radio Access Network (E-UTRAN)-NR DC (EN-DC) according to an embodiment of the application.

Referring to FIG. 2, FIG. 2 is an overall networking architecture diagram of EN-DC. An eNB is an LTE base station, a gNB is an NR base station, and an EPC includes a Mobility Management Entity (MME)/Serving Gateway (S-GW).

For a Radio Resource Control (RRC) connection resume process, UE sends a Message 3 (MSG3) (an RRC resume request message) to a target base station side. Then, on a UE side, a Signaling Radio Bearer (SRB) 1 is recovered and Access Stratum (AS) security is activated. An MSG4 is waited to be received on the SRB1. Meanwhile, all bearer configurations may be simultaneously recovered through the MSG4.

Under a normal condition, an MN may determine whether to add an SN or update an SN or not based on a measurement reporting result of UE. After the UE in a DC mode enters an inactive state, when an RRC connection is resumed, the MN may not configure appropriate SN information for the UE in an MSG4.

Figure 3:
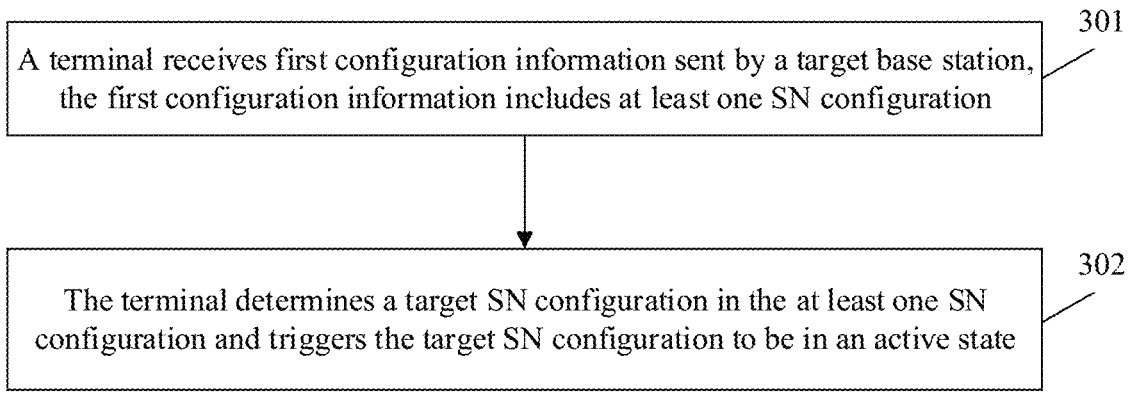
FIG. 3 is a first flowchart of an information configuration method according to an embodiment of the application.

FIG. 3 is a first flowchart of an information configuration method according to an embodiment of the application. As shown in FIG. 3, the information configuration method includes the following steps.

In 301, a terminal receives first configuration information sent by a target base station, the first configuration information includes at least one SN configuration.

In the embodiment of the application, the terminal may be any device capable of communicating with a network, such as a mobile phone, a tablet computer, a vehicle terminal device and a notebook computer.

In the embodiment of the application, the target base station refers to a base station presently serving the terminal, may be an eNB or may also be a gNB.

In the embodiment of the application, the terminal supports a DC mode, namely the terminal may access a core network through an MN and an SN.

In the embodiment of the application, the terminal sends a first request message to the target base station, the first request message is used to resume an RRC connection. The terminal receives a first response message sent by the target base station, the first response message includes the first configuration information.

Furthermore, configuration information of at least one base station adjacent to the target base station is configured on the target base station side. The first configuration information is determined by the target base station based on the configuration information of the at least one base station adjacent to the base station.

Herein, the configuration information of a base station adjacent to the target base station includes at least one of: information of cells of a base station adjacent to the target base station, capability information of each cell of a base station adjacent to the target base station and a coverage of each cell of a base station adjacent to the target base station.

For example, each base station is configured with configuration information of base stations adjacent to the base station, including cells of the adjacent base stations and capability information, coverage and the like of each cell. The UE sends the RRC resume request message (i.e., the first request message) to the target base station. The target base station acquires context information of the terminal from an original serving base station. If the context information of the terminal includes DC configuration information, the target base station may determine to configure SNs. Specifically, the target base station determines to add one or more SN configurations according to the configuration information of the adjacent base station (the information of the cell of the adjacent base station, the capability information of each cell of the adjacent base station and the coverage of each cell of the adjacent base station). Herein, each SN configuration is associated with an index value, and in addition, each SN configuration includes one Primary Secondary Cell (Pscell) configuration and at least one Secondary Cell (Scell) configuration. The target base station sends the one or more SN configurations to the UE through an MSG4.

In 302, the terminal determines a target SN configuration in the at least one SN configuration and triggers the target SN configuration to be in an active state.

In the embodiment of the application, the first configuration information may include one SN configuration or may also include multiple SN configurations. The two conditions are described below respectively.

1) If the first configuration information includes one SN configuration, after the terminal receives the first configuration information, the SN configuration is determined as the target SN configuration, the target SN configuration is in the active state.

Herein, if the target base station configures one SN configuration for the terminal, after the target base station sends the MSG4 (bearing the SN configuration) to the terminal, the SN configuration is in the active state.

2) If the first configuration information includes multiple SN configurations, the terminal selects an SN configuration from the multiple SN configurations as the target SN configuration based on signal measurement results of cells in an inactive state and sends index information corresponding to the target SN configuration to the target base station, to enable the target SN configuration to be in the active state.

Herein, if the target base station configures the multiple SN configurations for the terminal, after the target base station sends the MSG4 (bearing the multiple SN configurations) to the terminal, all the SN configurations are in the inactive state. The terminal selects an SN configuration from the multiple SN configurations as the target SN configuration based on the signal measurement results of the cells in the inactive state and notifies the target SN configuration to the target base station, to enable the target SN configuration to be in the active state. Furthermore, each SN configuration in the first configuration information corresponds to a piece of index information, and the terminal sends the index information corresponding to the target SN configuration to the target base station.

In an implementation mode, each SN configuration includes configuration information of at least one cell, and the terminal determines a cell in the at least one cell to be a Pscell of a respective SN. For example, each SN configuration includes configuration information of at least one cell, and in such case, the terminal specifies a Pscell in the at least one cell.

In another implementation mode, each SN configuration includes configuration information of at least one cell, the at least one cell includes a first cell and/or at least one second cell, the first cell is a Pscell configured by a network side and the second cell is a Scell configured by the network side. The terminal determines a cell in the at least one cell to be a Pscell of a respective SN, the Pscell determined by the terminal is the same as or different from the Pscell configured by the network side. For example, each SN configuration includes configuration information of a Pscell and configuration information of at least one Scell, and in such case, the terminal may use the Pscell configured by the network side by default or re-specify a Pscell in the at least one Scell configured by the network side.

Based on this, when the target SN configuration is in the active state, in the target SN configuration, the Pscell determined by the terminal is in the active state, and the Scell determined by the terminal is in the inactive state.

For example, the terminal acquires the multiple SN configurations from the network side, and the terminal determines an appropriate SN configuration in the multiple SN configurations according to the measurement result in the inactive state and feeds back the index information of the SN configuration to the target base station in a Message 5 (MSG5). After the MSG5 is sent, the SN configuration is in the active state. However, only the Pscell is available (in the active state), and the other Scells are still in the inactive state. Herein, the Pscell may be configured by the network side or may also be re-specified by the terminal.

For another example, the terminal acquires one SN configuration from the network side, and the SN configuration is in the active state. However, only the Pscell is available (in the active state), and the other Scells are still in the inactive state. Herein, the Pscell may be configured by the network side or may also be re-specified by the terminal.

Activation of the Scell may be implemented in the following manners.

1) The terminal sends the signal measurement results of the cells in the inactive state and/or identification information of the Pscell determined by the terminal in the target SN configuration to the target base station, the signal measurement results of the cells in the inactive state are used to trigger the target base station to transmit an activation command for the at least one Scell in the target SN configuration. Herein, the terminal reports the measurement result to the target base station to trigger the target base station to transmit the activation command for the Scell at a target SN.

Herein, the identification information of the Pscell includes at least one of a Physical Cell Identifier (PCI) of the Pscell, a Cell Identifier (CI) of the Pscell and index information of the Pscell in the target SN configuration.

2) The terminal determines at least one cell to be activated in the target SN configuration based on the signal measurement results of the cells in the inactive state, the at least one cell includes the Pscell and/or at least one Scell, which are determined by the terminal side, and the terminal sends identification information of the at least one cell to be activated to the target base station. Herein, the present UE determines and selects the cells to be activated in the SN, i.e., the Pscell and/or the at least one Scell, according to the measurement result in the inactive state. The terminal notifies the Pscell to be activated and/or the at least one Scell to be activated to the network side in the MSG5. The Pscell may be the same as or different from that configured by the network side.

Herein, the identification information of the at least one cell includes at least one of:

a PCI of the one Pscell and/or a PCI of each of the at least one Scell;

a CI of the one Pscell and/or a CI of each of the at least one Scell;

index information of the one Pscell in the target SN configuration and/or index information of each of the at least one Scell in the target SN configuration; and index information of the one Pscell in the target SN configuration and/or first bitmap information, each bit in the first bitmap information corresponds to a Scell in the target SN configuration and a value of the bit represents whether the corresponding Scell is to be in the active state or not.

In the solution, the number of bits in the first bitmap information is consistent with the number of the Scells in the target SN configuration. For example, the network configures index numbers of each cell in the SN configuration to be 0, 1, 2, 3 and 4 respectively, and the terminal, responsive to determining that one Pscell and at least one Scell are required to be activated, feeds back the index number (for example, 0) of the Pscell and a bitmap corresponding to a Scell list required to be activated, the bitmap includes 4 bits, each bit corresponds to an index of a Scell and a value of the bit represents whether the corresponding Scell is to be activated or not. For example, if the bitmap corresponding to the cell indexes 1, 2, 3 and 4 is 0100, it is indicated that only the second Scell (the index is 2) is to be in the active state and the other cells are to be in the inactive state. Herein, if the value of the bit is 1, it is indicated that the corresponding Scell is to be activated. Or, of course, if the value of the bit is 0, it may be indicated that the corresponding Scell is to be activated.

In the solution, the terminal supports the DC mode. In the DC mode, the target base station, as a target MN, forms a DC network with the target SN.

Figure 4:
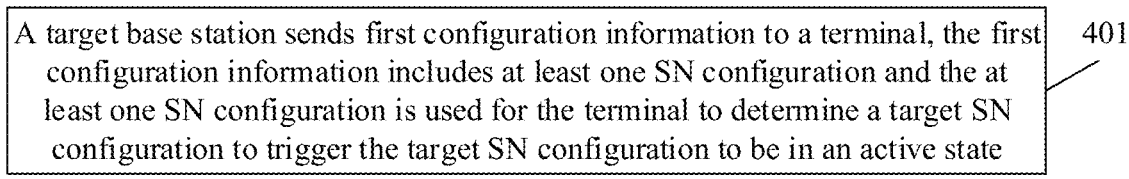
FIG. 4 is a second flowchart of an information configuration method according to an embodiment of the application.

FIG. 4 is a second flowchart of an information configuration method according to an embodiment of the application. As shown in FIG. 4, the information configuration method includes the following step.

In 401, a target base station sends first configuration information to a terminal, the first configuration information includes at least one SN configuration and the at least one SN configuration is used for the terminal to determine a target SN configuration to trigger the target SN configuration to be in an active state.

In the embodiment of the application, the target base station refers to a base station presently serving the terminal, may be an eNB or may also be a gNB.

In the embodiment of the application, the terminal may be any device capable of communicating with a network, such as a mobile phone, a tablet computer, a vehicle terminal device and a notebook computer.

In the embodiment of the application, the terminal supports a DC mode, namely the terminal may access a core network through an MN or an SN.

In the embodiment of the application, the target base station receives a first request message sent by the terminal, the first request message is used to resume an RRC connection. The target base station sends a first response message to the terminal, the first response message includes the first configuration information.

Furthermore, the target base station side is configured with configuration information of at least one base station adjacent to the target base station. The target base station determines the first configuration information based on the configuration information of the at least one base station adjacent to the target base station. Specifically, the target base station adds at least one SN for the terminal and generates the first configuration information based on an SN configuration of the at least one SN.

Herein, the configuration information of a base station adjacent to the target base station includes at least one of: information of cells of a base station adjacent to the target base station, capability information of each cell of a base station adjacent to the target base station and a coverage of each cell of a base station adjacent to the target base station.

For example, a base station is configured with configuration information of base stations adjacent to the base station, including cells of the adjacent base stations and capability information, coverage and the like of each cell. The UE sends an RRC resume request message (i.e., the first request message) to the target base station. The target base station acquires context information of the terminal from an original serving base station. If the context information of the terminal includes DC configuration information, the target base station may determine to configure SNs. Specifically, the target base station determines to add one or more SN configurations according to the configuration information of the adjacent base station (the information of the cells of the adjacent base station, the capability information of each cell of the adjacent base station and the coverage of each cell of the adjacent base station). Herein, each SN configuration is associated with an index value, and in addition, each SN configuration includes one Pscell configuration and at least one Scell configuration. The target base station sends the one or more SN configurations to the UE through an MSG4.

In the embodiment of the application, the first configuration information may include one SN configuration or may also include multiple SN configurations. The two conditions are described below respectively.

1) If the first configuration information includes multiple SN configurations, the target base station receives index information corresponding to the target SN configuration from the terminal, the target SN configuration is an SN configuration selected from the multiple SN configurations by the terminal based on signal measurement results of cells in an inactive state and the target SN configuration is to be in the active state.

Herein, if the target base station configures one SN configuration for the terminal, after the target base station sends the MSG4 (bearing the SN configuration) to the terminal, the SN configuration is in the active state.

2) If the first configuration information includes one SN configuration, after the target base station sends the first configuration information to the terminal, the terminal determines the one SN configuration to be the target SN configuration in the active state.

Herein, if the target base station configures the multiple SN configurations for the terminal, after the target base station sends the MSG4 (bearing the multiple SN configurations) to the terminal, all the SN configurations are in the inactive state. The terminal selects an SN configuration from the multiple SN configurations as the target SN configuration based on the signal measurement results of cells in an inactive state and notifies the target SN configuration to the target base station, to enable the target SN configuration to be in the active state. Furthermore, each SN configuration in the first configuration information corresponds to a piece of index information, and the target base station receives the index information corresponding to the target SN configuration from the terminal.

In an implementation mode, each SN configuration includes configuration information of at least one cell, and the terminal determines a Pscell of a respective SN in the at least one cell. For example, each SN configuration includes configuration information of at least one cell, and in such case, the terminal specifies a Pscell in the at least one cell.

In another implementation mode, each SN configuration includes configuration information of at least one cell, the at least one cell includes a first cell and/or at least one second cell, the first cell is a Pscell configured by a network side and the second cell is a Scell configured by the network side. The terminal determines a Pscell of a respective SN in the at least one cell, the Pscell determined by the terminal is the same as or different from the Pscell configured by the network side. For example, each SN configuration includes configuration information of a Pscell and configuration information of at least one Scell, and in such case, the terminal may use the Pscell configured by the network side by default or re-specify a Pscell in the at least one Scell configured by the network side.

Based on this, when the target SN configuration is in the active state, in the target SN configuration, the Pscell determined by the terminal is in the active state, and the Scell determined by the terminal is in the inactive state.

For example, the terminal acquires the multiple SN configurations from the network side, and the terminal determines an appropriate SN configuration in the multiple SN configurations according to the measurement result in the inactive state and feeds back the index information of the SN configuration to the target base station in an MSG5. After the MSG5 is sent, the SN configuration is in the active state. However, only the Pscell is available (in the active state), and the other Scells are still in the inactive state. Herein, the Pscell may be configured by the network side or may also be re-specified by the terminal.

For another example, the terminal acquires one SN configuration from the network side, and the SN configuration is in the active state. However, only the Pscell is available (in the active state), and the other Scells are still in the inactive state. Herein, the Pscell may be configured by the network side or may also be re-specified by the terminal.

Activation of the Scell may be implemented in the following manners.

1) The target base station receives signal measurement results of cells in an inactive state and/or identification information of the Pscell determined by the terminal in the target SN configuration from the terminal, and the target base station transmits an activation command for the at least one Scell in the target SN configuration based on the signal measurement results of the cells in the inactive state.

Herein, the identification information of the Pscell includes at least one of a PCI of the Pscell, a CI of the Pscell or index information of the Pscell in the target SN configuration.

2) The target base station receives identification information of at least one cell to be activated from the terminal, the at least one cell including one Pscell and/or at least one Scell, which are determined by the terminal side based on the signal measurement results of the cells in the inactive state in the target SN configuration.

Herein, the identification information of the at least one cell includes at least one of:
  a PCI of the one Pscell and/or a PCI of each of the at least one Scell;
  a CI of the one Pscell and/or a CI of each of the at least one Scell;
  index information of the one Pscell in the target SN configuration and/or index information of each of the at least one Scell in the target SN configuration; and
  the index information of the Pscell in the target SN configuration and/or first bitmap information, each bit in the first bitmap information corresponds to a Scell in the target SN configuration and a value of the bit represents whether the corresponding Scell is to be in the active state or not.

In the solution, the number of bits in the first bitmap information is consistent with the number of the Scells in the target SN configuration. For example, the network configures index numbers of each cell in the SN configuration to be 0, 1, 2, 3 and 4 respectively, and the terminal, responsive to determining that the one Pscell and at least one Scell are required to be activated, feeds back the index number (for example, 0) of the Pscell and a bitmap corresponding to a Scell list required to be activated, the bitmap includes 4 bits, each bit corresponds to an index of a Scell and a value of the bit represents whether the corresponding Scell is to be activated or not. For example, if the bitmap corresponding to the cell indexes 1, 2, 3 and 4 is 0100, it is indicated that only the second Scell (the index is 2) is to be in the active state and the other cells are to be in the inactive state. Herein, if the value of the bit is 1, it is indicated that the corresponding Scell is to be activated. Or, of course, if the value of the bit is 0, it may be indicated that the corresponding Scell is to be activated.

In the solution, in the DC mode, the target base station, as a target MN, forms a DC network with a target SN.

Figure 5:
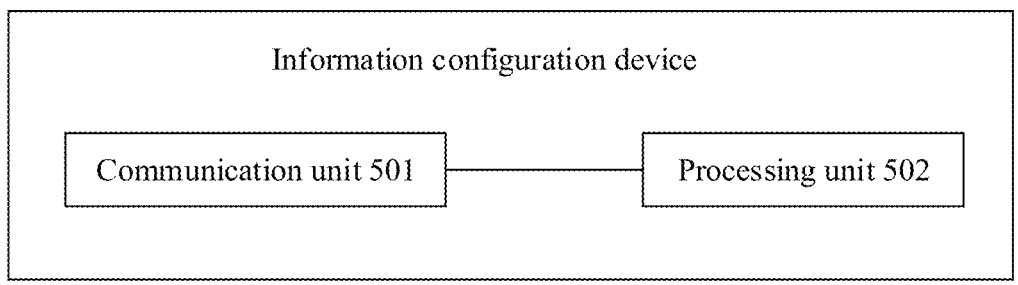
FIG. 5 is a structure composition diagram of an information configuration apparatus according to an embodiment of the application.

FIG. 5 is a structure composition diagram of an information configuration apparatus according to an embodiment of the application. As shown in FIG. 5, the device includes a communication unit 501 and a processing unit 502. The information configuration apparatus of the embodiment of the application will be described below in combination with different examples.

A first example

The communication unit 501 is configured to receive first configuration information sent by a target base station, the first configuration information includes at least one SN configuration.

The processing unit 502 is configured to determine a target SN configuration in the at least one SN configuration and trigger the target SN configuration to be in an active state.

In an implementation mode, if the first configuration information includes multiple SN configurations, the processing unit 502 selects an SN configuration from the multiple SN configurations as the target SN configuration based on signal measurement results of cells in an inactive state, and the communication unit 501 sends index information corresponding to the target SN configuration to the target base station, to enable the target SN configuration to be in the active state.

In an implementation mode, if the first configuration information includes one SN configuration, after the communication unit 501 receives the first configuration information, the processing unit 502 determines the one SN configuration to be the target SN configuration, the target SN configuration is in the active state.

In an implementation mode, each SN configuration includes configuration information of at least one cell.

The processing unit 502 determines a cell in the at least one cell as a Pscell of a respective SN.

In an implementation mode, each SN configuration includes configuration information of at least one cell, the at least one cell includes one first cell and/or at least one second cell, the first cell is a Pscell configured by a network side and the second cell is a Scell configured by the network side. The processing unit 502 determines a cell in the at least one cell as a Pscell of a corresponding SN, the Pscell determined by the processing unit 502 is the same as or different from the Pscell configured by the network side.

In an implementation mode, when the target SN configuration is in the active state, in the target SN configuration, the Pscell determined by a terminal is in the active state, and the Scell determined by the terminal is in the inactive state.

In an implementation mode, the communication unit 501 is further configured to send the signal measurement results of the cells in the inactive state and/or identification information of the Pscell determined by the terminal in the target SN configuration to the target base station, the signal measurement results of the cells in the inactive state are used to trigger the target base station to transmit an activation command for the at least one Scell in the target SN configuration.

Herein, the identification information of the Pscell includes at least one of a PCI of the Pscell, a CI of the Pscell and index information of the Pscell in the target SN configuration.

In an implementation mode, the processing unit 502 is further configured to determine at least one cell to be activated in the target SN configuration based on the signal measurement results of the cells in the inactive state, the at least one cell includes the Pscell and/or at least one Scell determined by the terminal side.

The communication unit 501 is further configured to send identification information of the at least one cell to be activated to the target base station.

Herein, the identification information of the at least one cell includes at least one of:

PCI of the one Pscell and/or PCI of each of the at least one Scell;

CI of the one Pscell and/or CI of each of the at least one Scell;

index information of the one Pscell in the target SN configuration and/or index information of each of the at least one Scell in the target SN configuration; and index information of the one Pscell in the target SN configuration and/or first bitmap information, each bit in the first bitmap information corresponds to a Scell in the target SN configuration and a value of the bit represents whether a respective Scell is to be in the active state.

In an implementation mode, the communication unit 501 is further configured to: send a first request message to the target base station, the first request message is used to resume an RRC connection; and receive a first response message sent by the target base station, the first response message includes the first configuration information.

In an implementation mode, configuration information of at least one base station adjacent to the target base station is configured on the target base station side, and the first configuration information is determined by the target base station based on the configuration information of the at least one base station adjacent to the target base station.

In an implementation mode, the terminal supports a DC mode. In the DC mode, the target base station, as a target MN, forms a DC network with a target SN.

A second example

The communication unit 501 is configured to send first configuration information to a terminal, the first configuration information includes at least one SN configuration and the at least one SN configuration is used for the terminal to determine a target SN configuration to trigger the target SN configuration to be in an active state.

In an implementation mode, if the first configuration information includes multiple SN configurations, the communication unit 501 receives index information corresponding to the target SN configuration from the terminal, the target SN configuration is an SN configuration selected from the multiple SN configurations by the terminal based on signal measurement results of cells in an inactive state and the target SN configuration is to be in the active state.

In an implementation mode, if the first configuration information includes one SN configuration, after the communication unit 501 sends the first configuration information to the terminal, the terminal determines the SN configuration as the target SN configuration in the active state.

In an implementation mode, each SN configuration includes configuration information of at least one cell, and the terminal determines a Pscell of a respective SN in the at least one cell.

In an implementation mode, each SN configuration includes configuration information of at least one cell, the at least one cell includes one first cell and/or at least one second cell, the first cell is a Pscell configured by a network side and the second cell is a Scell configured by the network side. The terminal determines a Pscell of a respective SN in the at least one cell, the Pscell determined by the terminal is the same as or different from the Pscell configured by the network side.

In an implementation mode, when the target SN configuration is in the active state, in the target SN configuration, the Pscell determined by a terminal is in the active state, and the Scell determined by the terminal is in the inactive state.

In an implementation mode, the communication unit 501 is configured to receive the signal measurement results of the cells in the inactive state and/or identification information of the Pscell determined by the terminal in the target SN configuration from the terminal and transmit an activation command for the at least one Scell in the target SN configuration based on the signal measurement results of the cells in the inactive state.

Herein, the identification information of the Pscell includes at least one of a PCI of the Pscell, a CI of the Pscell and index information of the Pscell in the target SN configuration.

In an implementation mode, the communication unit 501 is configured to receive identification information of at least one cell to be activated from the terminal, the at least one cell includes one Pscell and/or at least one Scell determined by the terminal side based on the signal measurement results of the cells in the inactive state from the target SN configuration.

Herein, the identification information of the at least one cell includes at least one of:
- PCI of the one Pscell and/or PCI of each of the at least one Scell;
- CI of the Pscell and/or CI of each of the at least one Scell;
- index information of the Pscell in the target SN configuration and/or index information of each of the at least one Scell in the target SN configuration; and
- index information of the Pscell in the target SN configuration and/or first bitmap information, each bit in the first bitmap information corresponds to a Scell in the target SN configuration and a value of the bit represents whether a respective Scell is to be in the active state.

In an implementation mode, the communication unit 501 is configured to: receive a first request message sent by the terminal, the first request message is used to resume an RRC connection; and send a first response message to the terminal, the first response message includes the first configuration information.

In an implementation mode, configuration information of at least one base station adjacent to the target base station is configured on a target base station side, and the device further includes the processing unit 502.

The processing unit 502 is configured to determine the first configuration information based on the configuration information of the at least one base station adjacent to the target base station.

In an implementation mode, in a DC mode, the target base station, as a target MN, forms a DC network with a target SN.

It is understood by those skilled in the art that the related descriptions about the information configuration apparatus of the embodiments of the application may be understood with reference to the related descriptions about the information configuration method of the embodiments of the application.

Figure 6:
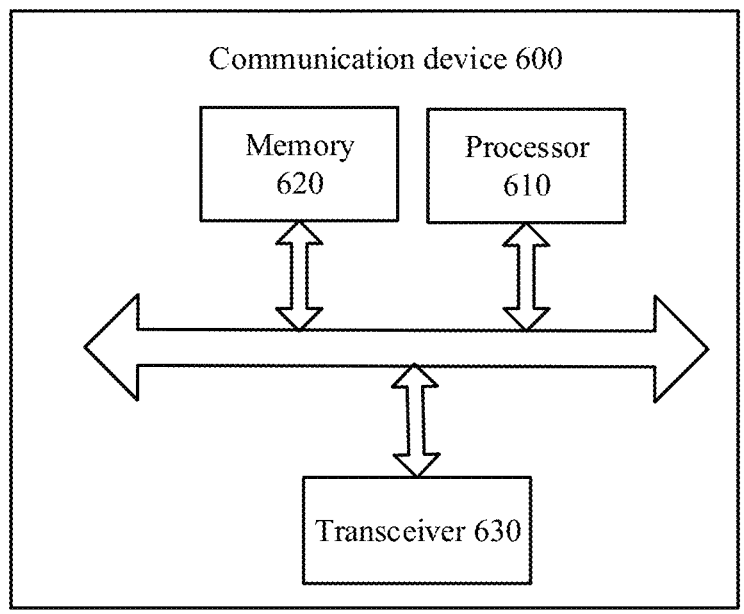
FIG. 6 is a schematic structure diagram of a communication device according to an embodiment of the application.

FIG. 6 is a schematic structure diagram of a communication device 600 according to an embodiment of the application. The communication device may be a terminal or may also be a network device. The communication device 600 shown in FIG. 6 includes a processor 610, and the processor 610 may call and run computer programs in a memory to implement the method in the embodiments of the application.

Optionally, as shown in FIG. 6, the communication device 600 may further include the memory 620. The processor 610 may call and run the computer programs in the memory 620 to implement the method in the embodiments of the application.

The memory 620 may be an independent device independent of the processor 610 and may also be integrated into the processor 610.

Optionally, as shown in FIG. 6, the communication device 600 may further include a transceiver 630, and the processor 610 may control the transceiver 630 to communicate with another device, specifically sending information or data to the other device or receiving information or data sent by the other device.

The transceiver 630 may include a transmitter and a receiver. The transceiver 630 may further include antennae, and the number of the antennae may be one or more.

Optionally, the communication device 600 may specifically be the network device of the embodiments of the application, and the communication device 600 may implement corresponding flows, implemented by the network device, in each method of the embodiments of the application. For simplicity, elaborations are omitted herein.

Optionally, the communication device 600 may specifically be the mobile terminal/terminal of the embodiments of the application, and the communication device 600 may implement corresponding flows, implemented by the mobile terminal/terminal, in each method of the embodiments of the application. For simplicity, elaborations are omitted herein.

Figure 7:
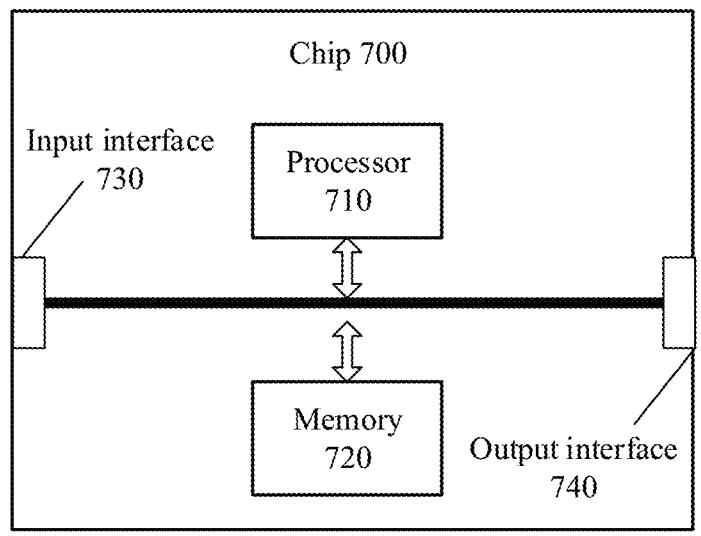
FIG. 7 is a schematic structure diagram of a chip according to another embodiment of the application.

FIG. 7 is a schematic structure diagram of a chip according to another embodiment of the application. The chip 700 shown in FIG. 7 includes a processor 710, and the processor 710 may call and run computer programs in a memory to implement the method in the embodiments of the application.

Optionally, as shown in FIG. 7, the chip 700 may further include the memory 720. The processor 710 may call and run the computer programs in the memory 720 to implement the method in the embodiments of the application.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with the other device or chip, specifically outputting information or data to the other device or chip.

Optionally, the chip may be applied to the network device of the embodiments of the application, and the chip may implement corresponding flows, implemented by the network device, in each method of the embodiments of the application. For simplicity, elaborations are omitted herein.

Optionally, the chip may be applied to the mobile terminal/terminal of the embodiment of the application, and the chip may implement corresponding flows, implemented by the mobile terminal/terminal, in each method of the embodiments of the application. For simplicity, elaborations are omitted herein.

It is to be understood that the chip mentioned in the embodiment of the application may also be called a system-level chip, a system chip, a chip system or a system on chip, etc.

Figure 8:
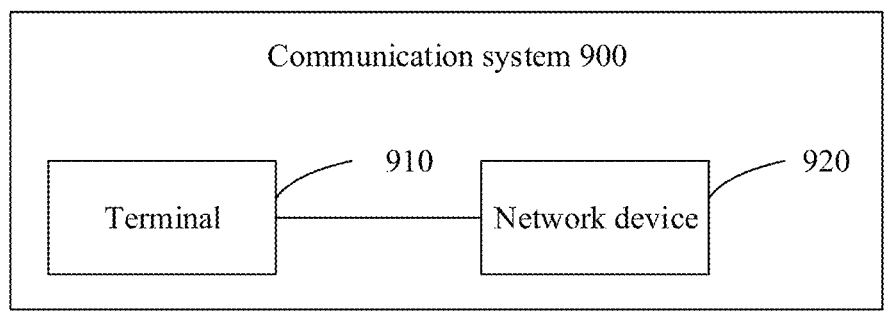
FIG. 8 is a schematic block diagram of a communication system according to an embodiment of the application.

FIG. 8 is a second block diagram of a communication system 900 according to an embodiment of the application. As shown in FIG. 8, the communication system 900 includes a terminal 910 and a network device 920.

The terminal 910 may be configured to realize corresponding functions, realized by the terminal, in the method, and the network device 920 may be configured to realize corresponding functions, realized by the network device, in the method. For simplicity, elaborations are omitted herein.

It is to be understood that the processor in the embodiment of the application may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the application may also be an SRAM, a DRAM, an SDRAM, a DDR SDRAM, an ESDRAM, an SLDRAM and a DR RAM. That is, the memory in the embodiments of the application is intended to include, but not limited to, memories of these and any other proper types.

The embodiments of the application also provide a computer-readable storage medium, which is configured to store computer programs.

Optionally, the computer-readable storage medium may be applied to a network device in the embodiments of the application, and the computer programs enable a computer to execute corresponding flows, implemented by the network device, in each method of the embodiments of the application. For simplicity, elaborations are omitted herein.

Optionally, the computer-readable storage medium may be applied to a mobile terminal/terminal in the embodiments of the application, and the computer programs enable a computer to execute corresponding flows implemented by the mobile terminal/terminal in each method of the embodiments of the application. For simplicity, elaborations are omitted herein.

The embodiments of the application also provide computer program product, which includes computer program instructions.

Optionally, the computer program product may be applied to a network device in the embodiments of the application, and the computer program instructions enable a computer to execute corresponding flows implemented by the network device in each method of the embodiments of the application. For simplicity, elaborations are omitted herein.

Optionally, the computer program product may be applied to a mobile terminal/terminal in the embodiments of the application, and the computer program instructions enable the computer to execute corresponding flows implemented by the mobile terminal/terminal in each method of the embodiments of the application. For simplicity, elaborations are omitted herein.

The embodiments of the application also provide computer programs.

Optionally, the computer programs may be applied to a network device in the embodiments of the application, and the computer programs run in a computer to enable the computer to execute corresponding flows implemented by the network device in each method of the embodiments of the application. For simplicity, elaborations are omitted herein.

Optionally, the computer programs may be applied to a mobile terminal/terminal in the embodiments of the application, and the computer programs run in the computer to enable the computer to execute corresponding flows implemented by the mobile terminal/terminal in each method of the embodiments of the application. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit 502, each unit may also physically exist independently, and two or more than two units may also be integrated into a unit.

According to the technical solutions of the embodiments of the application, the base station configures one or more SN configurations for the terminal; if the base station configures one SN configuration for the terminal, the SN configuration is in the active state; and if the base station configures multiple SN configurations for the terminal, the terminal selects an appropriate SN configuration according to a measurement result and notifies the selected SN configuration to the base station, to trigger the base station to activate the SN configuration, so that an SN is rapidly and accurately recovered by the terminal in an inactive state.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. An information configuration method, comprising:
receiving, by a terminal, first configuration information sent by a target base station, the first configuration information comprising at least one Secondary Node (SN) configuration;
determining, by the terminal, a target SN configuration in the at least one SN configuration,
wherein receiving, by the terminal, the first configuration information sent by the target base station comprises:
sending, by the terminal, a first request message to the target base station, the first request message being used to resume a Radio Resource Control (RRC) connection; and
receiving, by the terminal, a first response message sent by the target base station, the first response message comprising the first configuration information,
wherein each SN configuration comprises configuration information of a plurality of cells, and the terminal determines a cell in the plurality of cells as a Primary Secondary Cell (Pscell) of a respective SN;
determining, by the terminal based on signal measurement results of cells in an inactive state, at least one cell to be activated in the target SN configuration, the at least one cell comprising one Pscell and/or at least one Secondary Cell (Scell), which are determined by the terminal side; and
sending, by the terminal, identification information of the at least one cell to be activated to the target base station.

2. The method of claim 1, wherein determining, by the terminal, the target SN configuration in the at least one SN configuration comprises:
in a case that the first configuration information comprises multiple SN configurations, selecting, by the terminal based on the signal measurement results of cells in the inactive state, an SN configuration from the multiple SN configurations as the target SN configuration; and
sending, by the terminal, index information corresponding to the target SN configuration to the target base station, to enable the target SN configuration to be in the active state.

3. The method of claim 1, wherein determining, by the terminal, the target SN configuration in the at least one SN configuration comprises:
in a case that the first configuration information comprises one SN configuration, determining, by the terminal, the one SN configuration to be the target SN configuration after receiving the first configuration information, wherein the target SN configuration is in an active state.

4. The method of claim 1, wherein the plurality of cells comprise at least one of:
one first cell; or
at least one second cell,
wherein the first cell is a Pscell configured by a network side and the at least one second cell is an Scell configured by the network side, and
wherein the Pscell determined by the terminal is the same as or different from a Pscell configured by the network side.

5. The method of claim 1, wherein when the target SN configuration is in an active state,
in the target SN configuration, the Pscell determined by the terminal is in the active state, and an Scell determined by the terminal is in an inactive state.

6. The method of claim 5, further comprising:
sending, by the terminal, to the target base station at least one of:
signal measurement results of cells in an inactive state; or
identification information of the Pscell determined by the terminal in the target SN configuration,
wherein the signal measurement results of the cells in the inactive state are used to trigger the target base station to transmit an activation command for the at least one Scell in the target SN configuration, wherein the identification information of the Pscell comprises at least one of a Physical Cell Identifier (PCI) of the Pscell, a Cell Identifier (CI) of the Pscell or index information of the Pscell in the target SN configuration.

7. The method of claim 1, wherein the identification information of the at least one cell comprises at least one of:
a Physical Cell Identifier (PCI) of the one Pscell, and/or a Physical Cell Identifier (PCI) of each of the at least one Scell;
a Cell Identifier (CI) of the one Pscell and/or a Cell Identifier (CI) of each of the at least one Scell;
index information of the one Pscell in the target SN configuration and/or index information of each of the at least one Scell in the target SN configuration; or
at least one of index information of the one Pscell in the target SN configuration or first bitmap information, wherein each bit in the first bitmap information corresponds to a Scell in the target SN configuration, and a value of the bit represents whether a respective Scell is to be in the active state.

8. The method of claim 1, wherein configuration information of at least one base station adjacent to the target base station is configured on the target base station side, and the first configuration information is determined by the target base station based on the configuration information of the at least one base station adjacent to the target base station.

9. The method of claim 1, wherein the terminal supports a Dual Connectivity (DC) mode, and in the DC mode, the target base station, as a target Master Node (MN), forms a DC network with a target SN.

10. An information configuration method, comprising:
sending, by a target base station, first configuration information to a terminal, the first configuration information comprising at least one Secondary Node (SN) configuration and the at least one SN configuration being used for the terminal to determine a target SN configuration,
wherein sending, by the target base station, the first configuration information to the terminal comprises:
receiving, by the target base station, a first request message sent by the terminal, the first request message being used to resume a Radio Resource Control (RRC) connection; and
sending, by the target base station, a first response message to the terminal, the first response message comprising the first configuration information,
wherein each SN configuration comprises configuration information of a plurality of cells, and a Primary Secondary Cell (Pscell) of a respective SN is determined by the terminal in the plurality of cells; and
receiving, by the target base station, identification information of at least one cell to be activated in the target SN configuration from the terminal, wherein the at least one cell in the target SN configuration is determined by the terminal based on signal measurement results of cells in an inactive state and comprises one Pscell and/or at least one Secondary Cell (Scell).

11. The method of claim 10, further comprising:
in a case that the first configuration information comprises multiple SN configurations,
receiving, by the target base station, index information corresponding to the target SN configuration from the terminal, the target SN configuration being an SN configuration selected from the multiple SN configurations by the terminal based on the signal measurement results of cells in the inactive state and the target SN configuration is to be in an active state.

12. The method of claim 10, wherein in a case that the first configuration information comprises one SN configuration, after the target base station sends the first configuration information to the terminal, the one SN configuration is determined by the terminal to be the target SN configuration in an active state.

13. The method of claim 10, wherein the plurality of cells comprises at least one of:
one first cell; or
at least one second cell,
wherein the first cell is a Pscell configured by a network side and the second cell is an Scell configured by the network side, and
wherein the Pscell determined by the terminal is the same as or different from the Pscell configured by the network side.

14. The method of claim 10, wherein, in a Dual Connectivity (DC) mode, the target base station, as a target Master Node (MN), forms a DC network with a target SN.

15. A terminal, comprising a processor, a memory and a transceiver, wherein
the memory is configured to store computer programs, and
the processor is configured to call and run the computer programs stored in the memory to execute operations of:
sending a first request message to a target base station via the transceiver, the first request message being used to resume a Radio Resource Control (RRC) connection;
receiving, via the transceiver, a first response message sent by the target base station, the first response message comprising first configuration information, the first configuration information comprises at least one Secondary Node (SN) configuration;
determining a target SN configuration in the at least one SN configuration;
wherein each SN configuration comprises configuration information of a plurality of cells, and the processor is further configured to determine a cell in the plurality of cells as a Primary Secondary Cell (Pscell) of a respective SN;
determining, based on signal measurement results of cells in an inactive state, at least one cell to be activated in the target SN configuration, the at least one cell comprising one Pscell and/or at least one Secondary Cell (Scell), which are determined by the terminal side; and
sending identification information of the at least one cell to be activated to the target base station.

16. The terminal of claim 15, wherein, in a case that the first configuration information comprises multiple SN configurations,
the processing unit is further configured to select, based on the signal measurement results of cells in the inactive state, an SN configuration from the multiple SN configurations as the target SN configuration, and
the communication unit is further configured to send index information corresponding to the target SN configuration to the target base station, to enable the target SN configuration to be in an active state.

17. The terminal of claim 15, wherein in a case that the first configuration information comprises one SN configuration,
the processor is further configured to call and run the computer programs stored in the memory to determine the one SN configuration to be the target SN configuration after receiving the first configuration information, the target SN configuration is in an active state.

18. The terminal of claim 15, wherein the plurality of cells comprise at least one of:
one first cell; or
at least one second cell,
wherein the first cell is a Pscell configured by a network side and the at least one second cell is a Secondary Cell (Scell) configured by the network side, and
wherein the Pscell determined by the processing unit is the same as or different from the Pscell configured by the network side.

19. The terminal of claim 15, wherein the terminal supports a Dual Connectivity (DC) mode, and in the DC mode, the target base station, as a target Master Node (MN), forms a DC network with a target SN.

* * * * *